Aug. 7, 1962  B. A. RITZENTHALER  3,048,336
ELECTRONIC INTEGRATOR

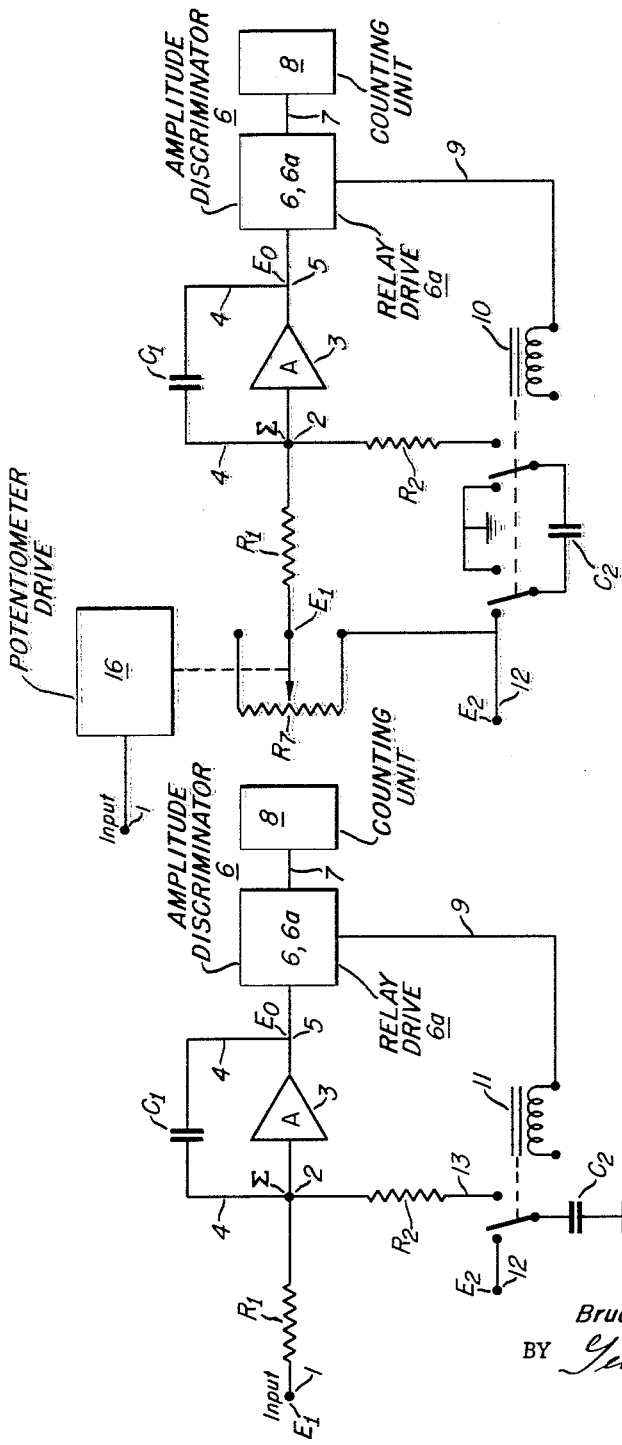

Filed Sept. 23, 1958  3 Sheets-Sheet 2

INVENTOR.
Bruce A. Ritzenthaler
BY
Gerald R____
ATTORNEY

INVENTOR.
Bruce A. Ritzenthaler
BY Gerald Rose
ATTORNEY

3,048,336
Patented Aug. 7, 1962

3,048,336
ELECTRONIC INTEGRATOR
Bruce A. Ritzenthaler, Chicago, Ill., assignor to Standard Oil Company, Chicago, Ill., a corporation of Indiana
Filed Sept. 23, 1958, Ser. No. 762,893
5 Claims. (Cl. 235—183)

This invention relates to electronic integration, and more particularly relates to a novel electronic circuit for integrating an input voltage with respect to time. The invention is especially concerned with providing a rugged high speed instrument for accurately integrating a voltage from an analytical device such as a mass spectrometer which expresses its result as the integral of a voltage with respect to time.

In chemical and metallurgical laboratories, as well as in the automatic monitoring and control of chemical processing operations, a variety of devices such as gas chromatographic columns and ultra-violet, infrared, and mass spectrometers are employed for automatically analyzing materials by means of physical or chemical properties. These devices express their analytical result in terms of a voltage which, when integrated with respect to time, is related to the desired quantitative analysis. It is common practice in such operations to record this voltage on a paper chart, and integrate the "peaks" by manually measuring their height and width or by mechanical planimetry.

While the analytical devices themselves have seen rapid development, improved methods of reading out these devices have not been forthcoming. Equipment which can rapidly integrate a voltage with respect to time has heretofore been obtained only at inordinately high cost, and even then frequently lacks the requisite accuracy for meaningful analytical results. Consequently, many users of modern analytical equipment still employ the old integrating techniques of manual peak measurements or planimetry in order to retain accuracy, and overlook the burdens of slow speed and high labor cost.

Accordingly, it is a primary object of the present invention to provide a highly accurate yet nonetheless simple and rugged circuit which has general utility for integrating an input voltage with respect to time and consequently provide a circuit for rapidly integrating the output of automatic analytical devices.

In accordance with the primary object expressed above and with other objects which will become evident from the detailed description hereinafter, apparatus is provided which is capable of unprecedented accuracy and speed in integrating an input voltage with respect to time. Broadly, the present inventive circuit comprises an electronic integrator capable of performing only a small fraction of the integration, means for detecting a preselected output of the integrator, means responsive to said output detecting means for resetting the integrator by a precise amount to an initial low output value, and means for counting the number of reset actions during a measuring period. The frequency at which resetting takes place is in part dependent upon conditions within the circuit which are selected to provide a relatively large number of reset actions during each measuring period, so that the number of resetting actions (less a fraction of one reset corresponding to the residual output of the integrator) is the time integral of the input voltage, and is thus related to the numerical analytical result desired. In the preferred embodiment of the instant invention, the circuit comprises an operational amplifier with the integrating capacitor and resistor connected as an electronic integrator, the amplifier output is detected by a Schmitt type amplitude discriminator, and resetting of the integrator is accomplished by a discriminator-operated relay which applies the charge taken from a capacitor charged to a fixed voltage as an inverse feedback or reset voltage to the summing junction of the operational amplifier.

The invention will be more fully described in the ensuing detailed description thereof read in conjunction with the appended drawings in which:

FIGURE 1 is a schematic diagram of one preferred embodiment of the instant invention in which the resetting capacitor is charged from an external regulated voltage source.

FIGURE 2 is a schematic diagram of a preferred embodiment in which the resetting capacitor is charged from the same voltage supply which is employed to amplify the input from the analytical device.

Figure 3:
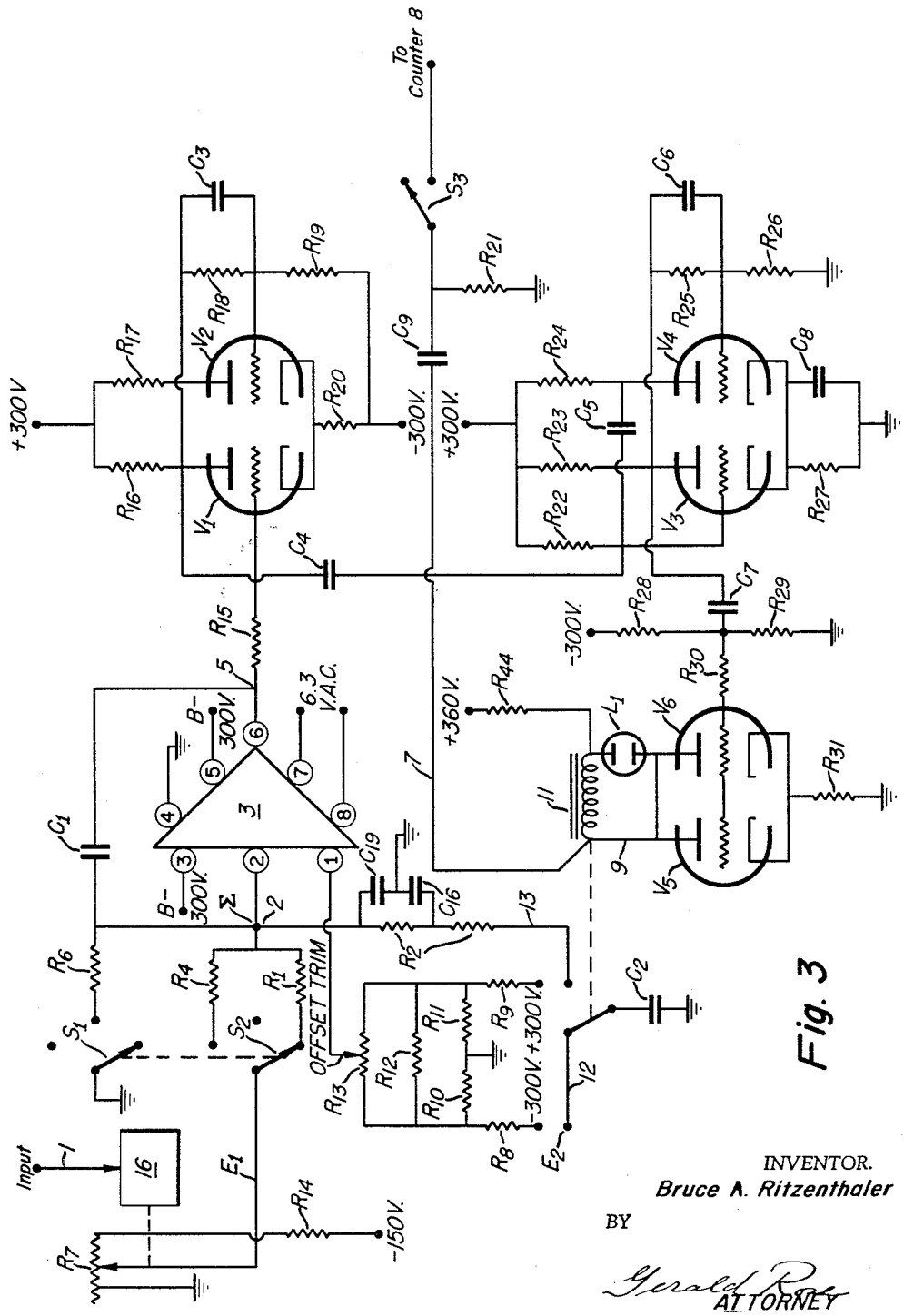
FIGURE 3 shows the preferred specific embodiment of the FIGURE 1 type circuit for integrating an input voltage, detecting a preselected output of the integrator, and resetting the integrator by applying an inverse resetting charge from a capacitor to the integrator.

Turning first to FIGURE 1 showing the preferred embodiment of the present invention, voltage $E_1$ from the detector of an analytical device such as a mass spectrometer or gas chromatographic column is fed into the unit at terminal 1. An operational amplifier 3 comprises a very high gain D.C. electronic amplifier 3 of the vacuum tube or transistor type, which is connected in circuit with resistor $R_1$ and capacitor $C_1$ to serve as an electronic integrator to integrate the input voltage with respect to time. Thus, considering only resistor $R_1$, capacitor $C_1$, and amplifier 3, the output $E_0$ of these components alone may be expressed by the formula $$E_0 = -\frac{1}{R_1 C_1} \int E_1 dT \qquad (1)$$

However, this integrator with a large $E_1$ is capable of performing only a small fraction of the necessary integration, and generally is limited to an $E_0$ of about 135 volts D.C.; at substantially higher $E_0$'s large errors are introduced due to saturation of amplifier 3.

To obviate this inaccuracy, an inverse or resetting feedback loop is provided which comprises amplitude discriminator 6 and relay driver 6a, line 9, relay 11, resistor $R_2$, and capacitor $C_2$. Amplitude discriminator 6 is adjusted to trigger a pulse whenever $E_0$ reaches a preselected voltage, conveniently about 100 volts. In practice the actual value of this preselected voltage is not determined, it being only necessary that the preselected voltage and the amplifier 3 output after resetting both be within the unable range of amplifier 3, i.e. between the positive and negative output voltages at which amplifier 3 saturates. This pulse is converted in a univibrator within circuit 6a to a square-wave pulse of about 100 volts and having a 2–10 millisecond length and this squarewave pulse is transmitted through line 9 to provide a powerful energizing pulse to relay 11.

Relay 11 is alternately positioned by means of driving circuit 6 to connect either with line 12 or with line 13. In the former position, relay 11 permits condenser $C_2$ to be charged to a fixed voltage $E_2$ provided by line 12. When relay 11 is switched to connect with line 13, the charge on condenser $C_2$ is released through line 13 and through resistor $R_2$, and is fed back into summing junction 2 of the integrator.

This feedback charge or voltage integrated in the same manner as $E_1$ is of a polarity opposite to the polarity of $E_1$ and serves to reset the electronic integrator to an initial low output value, which is equal to $E_0$ less $E_2$ $(C_2/C_1)$. Thus, as $E_0$ increases in response to the voltage and time of $E_1$, whenever $E_0$ reaches a preselected voltage determined by amplitude discriminator 6 an inverse voltage or charge is introduced into the integrator summing junction 2 to reset the integrator and thus reduce $E_o$ to a lower value, and the integration resumes.

The above resetting action depends upon the values of resistors $R_1$ and $R_2$ and condensers $C_1$ and $C_2$ in accordance with the following formula $$E_o = -\frac{1}{R_1 C_1}\int E_1 dT + N\frac{C_2}{C_1}E_2 \qquad (2)$$

where N is the number of counts, T is the time, and $E_2$ is the charge on condenser $C_2$, all in consistent units. The action of the feedback or reset circuit is to maintain $E_o$ at a constant average value which can be, but need not be, zero volts. Since $E_o$ is small in relation to the other terms, we may write $$\frac{E_1 T}{R_1 C_1} = N\frac{C_2}{C_1}E_2 \qquad (3)$$

Note that ignoring $E_o$ introduces a slight error in the expression, and for this reason N is maintained as large as possible to minimize the error. If $N/T$ is replaced by "n," in units of counts per second, Formula 3 then becomes $$n = \frac{E_1}{(E_2)}\frac{1}{R_1 C_2} \qquad (4)$$

Thus, the frequency at which resetting or feedback action occurs is directly proportional to $E_1$ and is inversely proportional to $E_2$, resistor $R_1$, and condenser $C_2$. In other words, Formula 4 indicates that the frequency of resetting depends on the input voltage $E_1$, the resetting voltage $E_2$, and the values of resistor $R_1$ and condenser $C_2$.

To provide a usable output of the integrator, means are provided herein for counting the number of resetting actions which occur during a measuring period. The number of counts, together with a fraction of one count which results if $E_o$ at the end of a measuring period is less than the limiting value detected by amplitude discriminator 6, is a precise integration of the input voltage with respect to time. To accomplish this counting, counter 8 is connected through line 7 to a convenient take-off in amplitude discriminator and relay driver unit 6. Alternatively electromagnetic-counter 8 can be connected in series with relay 10. Each time amplitude discriminator 6 signals, counter 8 sums the action and indicates the count on a readable device, e.g. an electromechanical counter.

The circuit of FIGURE 1 is particularly suitable for integrating comparatively high voltage inputs, i.e. voltages which may vary from 0 to 3 or 4 volts, up to inputs which may vary from 0 to 100 or more volts. These large inputs may be derived from analytical devices using, for example, thermistor bridges as detectors. The circuit may also be useably employed when inputs on the order of millivolts or even microvolts are encountered, as when an electrical resistance filament or a thermocouple is used as detector. Since the circuit of FIGURE 1 employs an independent resetting voltage $E_2$, either a direct input from a detector or an amplified input may be fed to the inventive circuit.

Where a recorder-amplifier is interposed between a detector and the integrator, or a mechanical motion is to be integrated against time, the circuit of FIGURE 2 may be more desirable. In this circuit, potentiometer drive 16 (which may, for example, be a recorder such as a Brown "Electronik" instrument serving both as an amplifier, a recorder, and a potentiometer drive) operates potentiometer $R_7$, which is supplied with regulated voltage $E_2$ furnished from line 12. $E_1$ is then potentiometer $R_7$ output, and hence the input to the integrator. In this event, both $E_1$ and $E_2$ are derived from the same source, and should there be any transient voltage fluctuation, this does not produce any error in the integration, since, from Formula 4 above, the counting rate "n" depends on the ratio of $E_1$ to $E_2$, and a variation in the supply voltage affects $E_1$ and $E_2$ identically, and the error is accordingly cancelled out. In the circuit of FIGURE 2, a double pole double throw switch is driven by relay 10 so that when both switches are in the left hand position, condenser $C_2$ is charged to the voltage of $E_2$ (or line 12) and while the switches are in the right hand position the charge on resetting condenser $C_2$ is released through resistor $R_2$ to summing junction 2. In all other respects, the detailed circuits of FIGURE 1 and FIGURE 2 may be identical.

Figure 4:
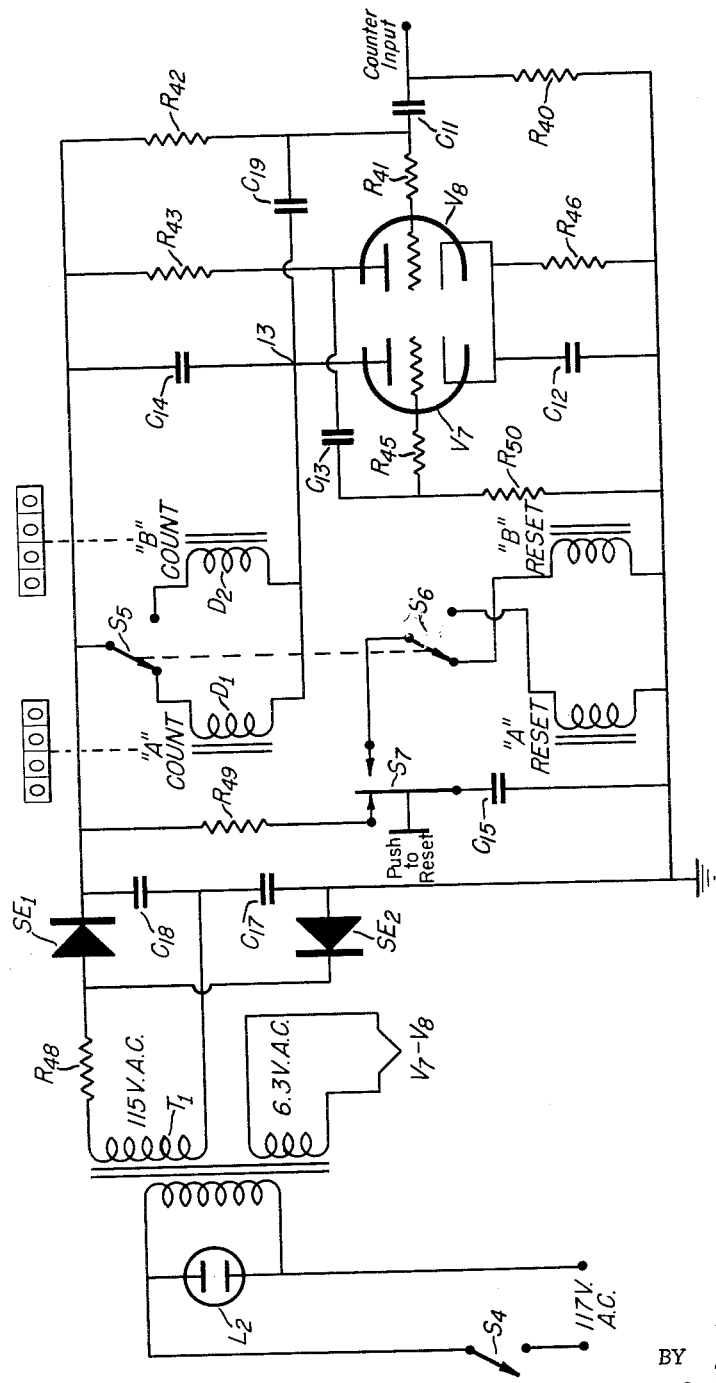
FIGURE 4 is the preferred form of a univibrator-driven counter unit for counting the resets occurring during successive measuring periods.

Turning now to FIGURE 4, the complete circuit diagram of a FIGURE 1 type circuit (including a potentiometer drive) including integrator, amplitude discriminator and relay driving circuit 6, and relay 11 is shown. To the left of FIGURE 3, a voltage from an analytical device is introduced into potentiometer drive unit 16, which here is a recorder mechanically coupled to variable potentiometer $R_7$ for the purposes of providing both a visible indication of the voltage produced from the analytical device and for generating a voltage within the range of about 0 to about minus 75 volts D.C. for input to the inventive circuit. Potentiometer $R_7$ may be connected to any power source such as a controlled 150 volt negative D.C. source. The output from potentiometer $R_7$ is fed into the circuit and introduced at switch $S_2$, which is ganged to switch $S_1$, both of which are single pole triple throw switches. In the uppermost position, these switches permit the sensing detector of an analytical device to be adjusted to give a zero output to potentiometer drive 16 and potentiometer $R_7$. In the intermediate position, a check can be made of baseline drift, i.e. the tendency of the indicator to count when no input voltage is applied. In the third position, the input voltage is fed through resistor $R_1$ which herein has a value selected to give a maximum reset counting rate of about 50 counts per second. The rate can be set by changing the value of $R_1$ to provide a rate as high as 100–200 counts per second, but is practically limited to about 50 c.p.s. in this design because of the counting rate of electromechanical counting unit 8. Resistor $R_1$ in FIGURE 3 corresponds with resistor $R_1$ in FIGURE 1.

The input voltage then passes to summing junction 2 and thence to operational amplifier 3, which delivers its output to junction 5. Amplifier 3 is a high gain D.C. amplifier, preferably of the commercially available chopper-stabilized type with power inputs as shown. Integrating condenser $C_1$ (corresponding to $C_1$ in FIGURE 1) is bridged across amplifier 3. The output $E_o$ of amplifier 3 at junction 5 then passes via resistor $R_{15}$ to the amplitude discriminator.

The amplitude discriminator of FIGURE 3 is of the Schmitt type and comprises triodes $V_1$ and $V_2$ along with resistors $R_{16}$ through $R_{19}$ and condenser $C_3$. The plate output of $V_1$ is RC coupled to the control grid of $V_2$ and also delivers its output through line 7 and condenser $C_4$ to the univibrator. Whenever the voltage applied to the grid of $V_1$ exceeds a value governed by the values of resistors $R_{18}$ and $R_{19}$, tube $V_1$ (which is initially non-conducting) becomes conducting and the $V_2$ is shut off, thus delivering a negative pulse from the plate of $V_1$. It is this pulse that ultimately is employed to activate relay 11 and transmit a resetting impulse to summing junction 2 of the integrator. Other types of amplitude discriminators, such as biased diodes, gas-filled diodes such as neon tubes, and thyratrons, may be employed in lieu of Schmitt triggers but are not necessarily the full equivalents thereof.

Output 7 of $V_1$ is transmitted through condenser $C_4$ to a univibrator for the purpose of converting the sharp negative pulse from the amplitude discriminator to a square wave of about 100 volts and about 5–10 milliseconds' duration which is suitable for energizing the relay driving circuit. As shown herein, the univibrator is of conventional design and utilizes a one-shot multivibrator which is triggered by the input pulse. The univibrator is essentially a two-stage RC coupled amplifier with one tube cut off and the other normally conducting. The balanced condition of the circuit is established by the arrangement for biasing the tubes. As an input pulse of sufficient amplitude to cut-off $V_3$ enters the circuit, a large positive pulse output from the plate circuit of tube $V_3$ results; the pulse length is controlled by the time constants of condenser $C_5$ and resistor $R_{22}$ and the plate resistance of tube $V_4$ in series. The circuit action is fully described in such publications as "Electronics Technician 3." NAVPERS 10888, USGPO, 1954, pages 340–343. After leaving univibrator 8, the square wave output pulse passes through line 9 to a driving circuit which comprises, in simple form, a triode tube amplifier with the output driving the power coil of relay 11. As shown in FIGURE 3 however, two tubes $V_5$ and $V_6$, respectively, are employed in parallel, and $V_6$ also energises neon bulb $L_1$ to provide a visible indication of the resetting action, and hence permit easy in-service inspection of the apparatus.

Relay 11 operates a single-pole-double throw switch which is alternately positionable between lines 12 and 13. When the switch is connected in line 12, a regulated voltage is permitted to charge condenser $C_2$ to a fixed charge. When, in its alternate position, the switch connects into line 13, the previously-established charge on condenser $C_2$ is caused to discharge via resistors $R_5$ and $R_2$ to summing junction 2 in the integrator. This charge is of opposite polarity to voltage $E_1$ and thus resets operational amplifier 3 in the manner previously described. Relay 11 is constructed of components which are characterized in having low mechanical inertia so as to permit relatively high—e.g. 50 to 100 actions per second—cycling rate. It will be observed that a low pass filter is provided in line 13, consisting of a divided resistor $R_2$ and condensers $C_{16}$ and $C_{19}$. This is a valuable adjunct to the circuit as it prevents high frequency components of the resetting voltage from interfering with the accuracy of the integrating action of the amplifier.

To count the number of resets delivered during a measuring period, line 15 is connected to the cathode output of tube $V_5$ in driving circuit 6 and passes via condenser $C_9$ and counter switch $S_3$ to counter unit 8 shown in detail in FIGURE 4. This unit employs a univibrator to drive an electromagnetic counter and provide a numerical indication of the number of resets during the measuring period.

Turning now to FIGURE 4, it is seen that the univibrator is of conventional design and employs two triode tubes, $V_7$ and $V_8$, to drive counter 8. The univibrator is an electron-tube oscillator that utilizes tubes $V_7$ and $V_8$ to feed the plate output of one tube to the grid input to the other (or vice versa) by means of resistance-capacitance coupling network consisting of condensers $C_{13}$ and $C_{19}$ and resistors $R_{42}$ and $R_{50}$. In the present application the univibrator is synchronized by the negative pulses from driving circuit tube $V_5$ and hence causes tubes $V_7$ and $V_8$ to deliver a strong squarewave output to the counter with each pulse. Univibrator and multivibrator theory and action are discussed in "Basic Electronics," NAVPERS 10087, USGPO, 1955, pages 324–335.

Counters employed herewith may be simple electromagnetic devices which indicate the number of pulses received during a measuring period. Alternatively, the counters may be of electronic type or those which express their totals in any other form of readout, such as teleprinter records or digital computer memory units. In accordance with FIGURE 4, the counter is duplicated so that the univibrator output may be employed to energize count coil "A" ($D_1$) or count coil "B" ($D_2$) on separate counters. Switching between counts is effected by switch $S_5$. Thus, one counter may be employed to integrate one peak while the other stores the result from a previous integration to permit the operator to record the count. Any number of counting units may be employed in similar manner. The particular counters used herewith are high speed electromagnetic counters with electrical resets to return the counter totals to zero upon manual activation of selector switch $S_6$ and reset button $S_7$. Operation of switch $S_6$ selects the counter to be reset, while switch $S_7$ permits a reset voltage (stored in condenser $C_{15}$) to pass through the respective reset coils and thus return the counters to zero.

As further shown in FIGURE 4, the counter unit is provided with 280 volt D.C. current by means of a voltage doubler unit connected to a 117 volt A.C. line via switch 4, which employs transformer $T_1$ and selenium rectifiers $SE_1$ and $SE_2$ in conventional manner to establish a doubled voltage and also provides 6.3 volt A.C. current to energize the tube filaments.

Power supplied to the various other components of the complete circuit described herein may be obtained from any convenient power source, such as the sources described in Greenwood et al., "Electronic Instruments, Radiation Laboratory Series," volume 21, McGraw-Hill, 1948, Part III; and "Preferred Circuits," NAVAER 16–1–519, National Bureau of Standards, September 1, 1955, circuits PC–1 through PC–5. A regulated voltage is necessary for optimum operation of the circuit shown in FIGURE 1, where a constant voltage $E_2$ is used to charge condenser $C_2$ which delivers a feedback voltage to operational amplifier 3. In the circuit of FIGURE 2, precise regulation of $E_2$ is unnecessary since the count rate is self-compensating.

To operate the apparatus described in FIGURES 3 and 4, line 1 is connected to an analytical device such as a gas chromatographic analyzer sensing bridge through a slave potentiometer mechanically connected to the slide wire of a recording potentiometer which delivers a voltage dependent on the concentration and/or presence of a given material in the sample under analysis. Switch $S_2$ is connected to the lowest terminal (providing a counting rate of about 50 counts per second), switch $S_3$ between driving circuit 6 and the counting unit is closed, and switch $S_6$ is turned to activate one of the counters which initially has a zero reading. Before the analytical device detects the presence of the material being sensed, neon bulb $L_1$ (in FIGURE 3) remains dark. As soon as the analytical device commences delivering its output to line 1, this voltage is amplified by amplifier and potentiometer drive 16 and fed via potentiometer $R_7$ to the circuit described above. Each time the output of operational amplifier 3 reaches the level determined by amplitude discriminator 6 a resetting action occurs and the action is indicated on counting unit 8. Resetting occurs on an average of between 25 and 1000 times during each peak. After bulb $L_1$ ceases flashing, thereby indicating no more resets are occurring, switch $S_6$ is turned to activate the other counter and the initial count is read from the counter previously employed.

In an operating test of the integration circuit, a hydrocarbon mixture of known composition was prepared and analyzed in a conventional gas chromatographic analyzer. The voltages produced by the chromatographic analyzer were integrated by the present device and also by manual planimetry. The following results were observed:

|  | Known, Wt. Percent | Found, Wt. Percent | |
| --- | --- | --- | --- |
|  |  | Automatic Integrator | Planimetry |
| Component: |  |  |  |
| n-Pentane | 32.2 | 32.1 | 32.2. |
| Pentene-1 | 16.5 | 16.1 | 16.0. |
| 2-Methyl Butene-2 | 51.3 | 51.8 | 51.8. |
| Time for Integration |  | Instantaneous. | 5 minutes. |

It will be noted that the present integrator furnished results which are at least as accurate as the results obtained by slow manual integration and which correspond closely to the known composition of each mixture.

Numerical values of resistors, capacitors, vacuum tubes, and miscellaneous equipment which were actually employed with the circuit according to FIGURES 3 and 4 are cataloged in the table below.

Resistors:
- $R_1$ — 5.0M.
- $R_2$ — 4.7K each, two resistors.
- $R_3$ — 20M.
- $R_4$ — 100K.
- $R_6$ — 4.7M.
- $R_7$ — 10K Beckman "Helipot," type A, 10 turns.
- $R_8$ — 4.7M.
- $R_9$ — 4.7M.
- $R_{10}$ — 47K.
- $R_{11}$ — 47K.
- $R_{12}$ — 47K.
- $R_{13}$ — 500K variable.
- $R_{14}$ — 5K.
- $R_{15}$ — 470K.
- $R_{16}$ — 22K.
- $R_{17}$ — 27K.
- $R_{18}$ — 270K.
- $R_{19}$ — 1M.
- $R_{20}$ — 68K.
- $R_{21}$ — 2.2M.
- $R_{22}$ — 0.82M.
- $R_{23}$ — 22K.
- $R_{24}$ — 22K.
- $R_{25}$ — 270K.
- $R_{26}$ — 220K.
- $R_{27}$ — 22K.
- $R_{28}$ — 6.8M.
- $R_{29}$ — 470K.
- $R_{30}$ — 220K.
- $R_{31}$ — 1.
- $R_{40}$ — 4.7M.
- $R_{41}$ — 47K.
- $R_{42}$ — 1.5M.
- $R_{43}$ — 20K.
- $R_{44}$ — 4.7K.
- $R_{45}$ — 47K.
- $R_{46}$ — 27K.
- $R_{48}$ — 10K.
- $R_{49}$ — 10K.

Capacitors:
- $C_1$ — 0.0025 μf
- $C_2$ — 0.005 μf
- $C_3$ — 50 μμf
- $C_4$ — 500 μμf
- $C_5$ — 0.2 μf
- $C_6$ — 50 μμf
- $C_7$ — 0.1 μf
- $C_8$ — 0.1 μf
- $C_9$ — 0.2 μf
- $C_{11}$ — 0.01 μf
- $C_{12}$ — 50 μf
- $C_{13}$ — 0.5 μf
- $C_{14}$ — 0.5 μf
- $C_{15}$ — 4 μf
- $C_{16}$ — 0.005 μf
- $C_{17}$ — 80 μf
- $C_{18}$ — 80 μf
- $C_{19}$ — 0.005 μf Tubes:
- $V_1$–$V_2$ — 12AT7
- $V_3$–$V_4$ — 12AT7
- $V_5$–$V_6$ — 12BH7
- $V_7$–$V_8$ — 12BH7

Misc. Hardware:
- 10 — Relay, 4100 ohm.
- 11 — Relay, 2800 ohm.
- $L_1$ — Neon bulb.
- $L_2$ — Neon bulb.
- $T_1$ — Transformer.
- $D_1$, $D_2$ — Electro-mechanical counters, 160 v, 3200 ohm counting and resetting coils.

From the foregoing presentation, it is clear that the present invention provides a major improvement in the art of automatic integration. For the first time, an integrator is provided which combines extremely rapid operation with unprecedented accuracy, and yet is ruggedly constructed, stable in operation and readily constructed and operated. Moreover, the integrator may be employed with a wide variety of analytical devices with equal facility, and may receive and integrate inputs from sources such as mass, infrared, and ultraviolet spectrometers and gas chromatographs.

Thus having described the invention, what is claimed is:

1. A circuit for integrating a varying voltage with respect to time which comprises: drive means controlling a potentiometer, means for applying said varying voltage to said drive means, means for applying a power voltage to said potentiometer, an electronic integrator including an operational amplifier, an input resistance, and a feedback capacitance for integrating the variable output of said potentiometer, means including an amplitude discriminator for detecting a preselected output of said electronic integrator, capacitor means responsive to said means including an amplitude discriminator for applying an inverse resetting voltage to said electronic integrator, said capacitor means being charged from the same voltage source as applies power voltage to said potentiometer, and means for counting the number of inverse resetting voltages applied during a measuring period as a measure of the integration.

2. A circuit employing only a single electronic integrator and adapted for integrating a voltage with respect to time which consists essentially of: only one electronic integrator including an operational amplifier, an input resistance, and a feed back capacitance; means including an amplitude discriminator for detecting only a preselected output of said electronic integrator; means responsive to said amplitude discriminator for applying a resetting voltage to said electronic integrator, said resetting voltage being obtained from a second capacitance charged to a fixed voltage; means for counting the number of resetting voltages applied during an integration period as a measure of the integration; and means for initially amplifying the input to said only one electronic integrator, said means including a potentiometer, with a power source supplying the same voltage to said potentiometer as is supplied to the capacitance for supplying the resetting voltage to the electronic integrator.

3. In a gas chromatography analyzer system which includes a detector delivering a varying low output voltage, the improvement which comprises: drive means adapted for amplifying the output voltage of said detector to a substantially higher voltage, said drive means including a potentiometer driven by an amplifier in said drive means; an electronic voltage integrator including only one operational amplifier receiving the higher voltage output from said potentiometer and deriving therefrom an integrated voltage; means for detecting a limiting derived integrated voltage; a capacitor charged to a fixed voltage from the same voltage source as supplies the voltage to said potentiometer; switch means operated by said detecting means for applying voltage from said capacitor as an inverse voltage to said integrator, thereby resetting said integrator to an initial output voltage; and means for counting the number of resets as a measure of the total integrated voltage, said total integrated voltage being related to the chromatographic analysis.

4. Apparatus for integrating with respect to time an electrical output voltage from an analytical device which comprises: drive means controlling a potentiometer, means for applying said electrical output voltage from said analytical device to said drive means, an electronic integrator for integrating the variable output of said potentiometer, means operating in response to a preselected integrator output for resetting said integrator by applying to said integrator an inverse resetting voltage, said inverse resetting voltage being obtained from a capacitor charged to a fixed voltage from the same source as supplied the voltage to said potentiometer, and means for counting the number of resets during an integration period as a measure of the integration.

5. Apparatus of claim 4 wherein said means operating in response to a preselected integrator output includes a Schmitt-type vacum tube discriminator.

References Cited in the file of this patent

UNITED STATES PATENTS

| 2,714,309 | Redemske | Aug. 2, 1955 |
| 2,864,556 | Raymond | Dec. 16, 1958 |
| 2,891,725 | Blumenthal et al. | June 23, 1959 |

FOREIGN PATENTS

| 1,079,188 | France | Nov. 26, 1954 |